US006502491B2

(12) United States Patent
Borowczak et al.

(10) Patent No.: US 6,502,491 B2
(45) Date of Patent: Jan. 7, 2003

(54) SAMPLE CUTTING APPARATUS

(75) Inventors: Marc Borowczak, North Canton, OH (US); Charles Frederick Crano, Uniontown, OH (US); Dale Roy Norton, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/003,536

(22) Filed: Nov. 2, 2001

(65) Prior Publication Data

US 2002/0046633 A1 Apr. 25, 2002

Related U.S. Application Data

(63) Continuation of application No. PCT/US99/10668, filed on May 13, 1999.

(51) Int. Cl.[7] .................................................. G01N 1/08
(52) U.S. Cl. ............................................ 83/358; 30/362
(58) Field of Search .......................... 30/358, 362, 368, 30/130, 366

(56) References Cited

U.S. PATENT DOCUMENTS 1,260,264 A * 3/1918 Huszar ........................ 30/130
5,517,868 A 5/1996 Turriff et al. ............ 73/864.44

FOREIGN PATENT DOCUMENTS

| | | | |
|---|---|---|---|
| DE | 19711305 | 9/1998 | |
| GB | 2192772 | 1/1998 | |
| WO | 9915875 | 4/1999 | ............ G01N/1/08 |

* cited by examiner

*Primary Examiner*—Douglas D. Watts
(74) *Attorney, Agent, or Firm*—David E. Wheeler; David L. King

(57) ABSTRACT

An apparatus (10) makes easier, simpler and quicker the obtention of a sample of materials for physical and/or chemical testing. The apparatus (10) comprises a housing (24) containing a ram (18), the housing (24) having an anvil end (22) and a cutting end (12). In a method of using the apparatus (10), the cutting end (12) is driven into a substrate (14) and a plug (16) of sample material is obtained. Plug (16) is removed form housing (24) by forcing ram (18) in the direction of plug (16).

5 Claims, 4 Drawing Sheets

SAMPLE CUTTING APPARATUS

This is a continuation of application No. PCT/US99/10668, filed May 13, 1999.

TECHNICAL FIELD

The invention relates to an apparatus for obtaining plug samples of materials for the purpose of measuring the physical and/or chemical properties of the sample.

BACKGROUND ART

In the development of industrial products, it is important that the quality and properties of raw materials, intermediate products, and finished materials used in final products be known. Basically, the sample of the material is removed from the main body of the materials being used, and the properties of the sample are measured. When the material to be tested is a solid, a piece of the material must be cut loose from the main body of the material. Because of safety issues, it is preferred that tools such as razor blade, knives, and other cutting objects not be used for obtaining such samples.

One prior art apparatus commonly used to obtain a plug of sample comprises a hollow tube, which is pounded into the material to be tested to cut loose a sample, which breaks off in the end of the tube to form a plug. Such a plug can be provided in a form that can be used directly in many kinds of tests. Although relatively safe to use, such a tool has the drawback that the plug, once jammed into the end of the tube, is difficult to remove, and from a man-hour standpoint, the obtaining of such samples is very expensive.

It is an object of the invention to provide an apparatus that makes easier, simpler, and cheaper the obtention of a sample of material from a solid body of raw material, intermediate materials, or finished materials. Other objects of the invention will be apparent from the following description and claims.

DISCLOSURE OF INVENTION

An apparatus for obtaining a plug of material for testing comprises (a) a housing (24) having a cutting end (12) and an anvil end (22), (b) a ram (18) contained within the housing (24) and, (c) a collar (20) disposed over an outside surface of the housing (24), the collar (20) having a non-fixed relationship with the housing (24) and a having a fixed relationship with the ram (18). The housing (24) may contain a spring loading means **(26,26*a*) associated with the ram (18)**.

In one embodiment, a spring (26) is in a surrounding relationship with said ram (18), and in an alternative embodiment a spring **(26*a*) is loaded within said housing (24) in cavity (40) of anvil (22)**.

The collar (20) is associated with the housing (24) through a pin (28) which passes through holes (34,34) in the collar and through slots (32) in the housing (24).

In the illustrated embodiment, the housing (24) comprises an upper portion (27) and a lower portion (25) which are connected to each other by mechanical means (19). The lower portion (25) has a resting flange (21) which provides a compression point for spring (26). The housing (24) has an endless cutting end (12) and an anvil end (22). The housing (24) may have a grip (15) in proximal relation to the anvil end (22).

Also provided is a method for obtaining a plug of material for testing the properties of the material comprising the steps of (a) providing an apparatus having a housing (24) having a cutting end (12) which has a endless cutting edge, (b) driving cutting end (12) into a substrate (14) thereby forming a plug (16) of substrate, (c) causing a ram (18) within housing (24) to move in the direction of plug (16), thereby forcing the plug (16) to be removed from cutting end (12).

FIGS. **6*a* and 6*b*** illustrates alternative configurations of component parts of the apparatus.

DETAILED DESCRIPTION OF THE INVENTION

Figure 1:
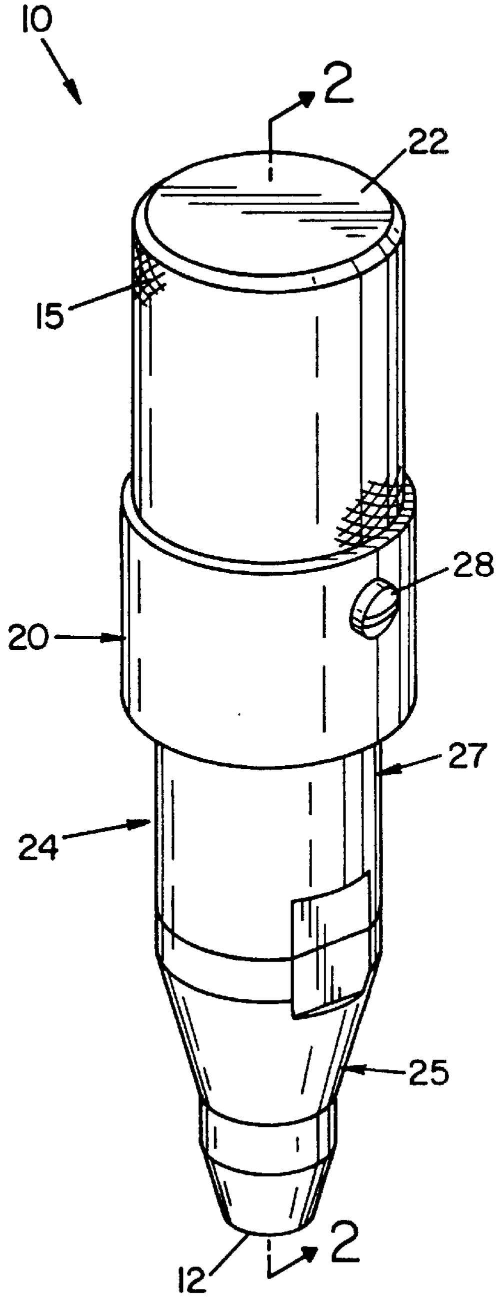
FIG. 1 illustrates a perspective view of the apparatus of the invention.

With reference now to FIG. 1, the apparatus 10 of the invention comprises a housing 24 which has a cutting end 12 and an anvil end 22. Cutting end 12 has an endless cutting edge which may have any desired geometrical shape. The apparatus 10 is designed so that cutting end 12 is jammed into or pounded into a material substrate from which a sample is needed for testing.

By endless cutting edge it is meant the cutting edge encloses an area of space. The enclosed area of space becomes the area occupied by a plug of material when the cutting edge is used to obtain a plug of sample. The cutting edge may be a circle, an oval, a square, or any other geometrical shape which can be used for testing a sample of material.

If apparatus 10 is pounded into a substrate, anvil end 22 receives a blow from a hammer or other object, to create force which is transferred to cutting end 12 which is placed against a substrate. Accordingly, the housing, and especially anvil end 22, is made of a structurally strong material, such as steel, and is preferably made of stainless steel.

A collar 20 is disposed over the outside of housing 24 and has a non-fixed relationship with housing 24.

Figure 2:
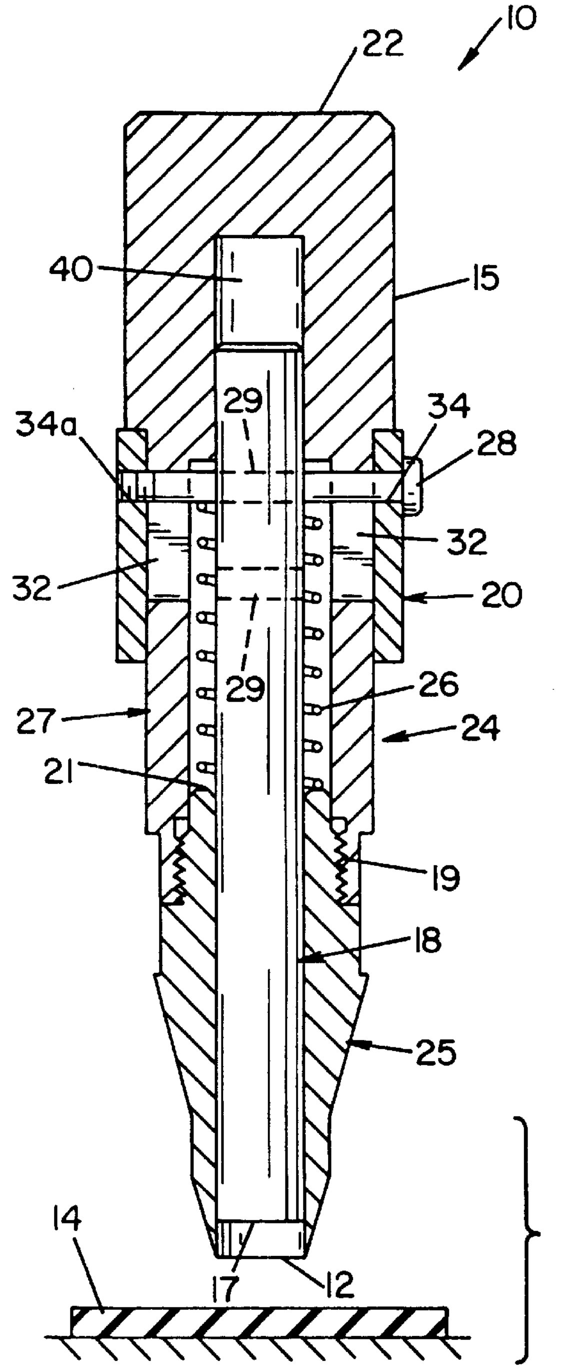
FIG. 2 illustrates a cross-section view of the apparatus of the invention along the line 2-2 of FIG. 1.

With reference now to FIG. 2, collar 20 has a fixed relationship with ram 18 which is contained within housing 24. In the illustrated embodiment, collar 20 is fixed to ram 18 using pin 28. Collar 20 may move relative to housing 24 when pin 28 moves in slot 32 of the housing. In the illustrated embodiment of FIG. 2, collar 20 is held at-rest by spring 26 which forces pin 28 to one end of slot 32.

Figure 3:
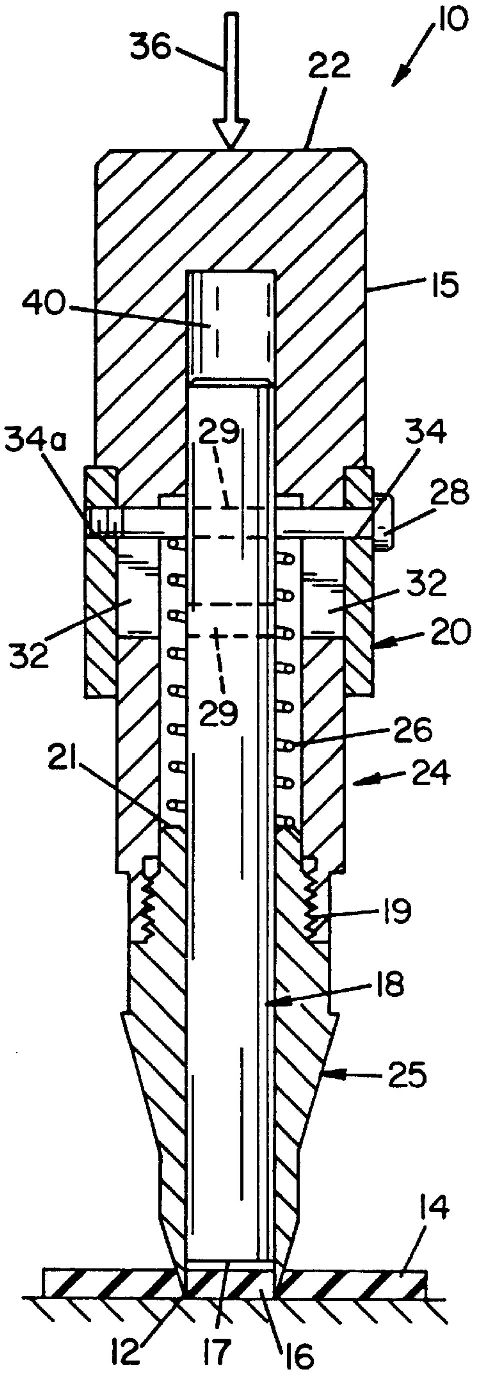
FIG. 3 illustrates the apparatus of the invention cutting a sample wherein the apparatus is in an at-rest position.

With reference now to FIGS. 2 and 3, when apparatus 10 is used to cut a sample of a substrate 14, a force is applied to anvil 22 which drives cutting end 12 into substrate 14. The at-rest position of ram 18 determines the depth of the cut provided in substrate 14.

Figure 4:
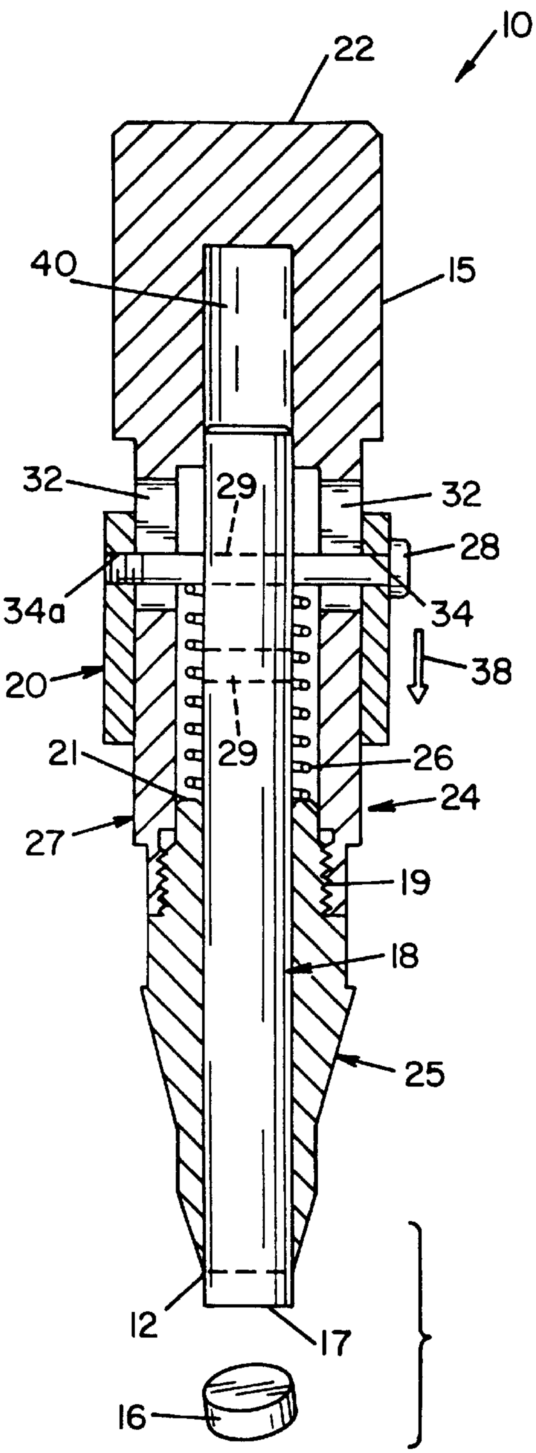
FIG. 4 illustrates the removal of a sample from the apparatus wherein the apparatus is in an active position.

With reference now to FIG. 4, removal of sample plug 16 from the cutting end of 12 of housing 24 is obtained by stabilizing the position of housing 24 and forcing collar 20 in the direction of cutting end 12 of housing 24. Thus moving collar 20 forces pin 28 in the same direction in slot 32, which forces ram 18 toward the cutting end 12 of housing 24. Stabilization of housing 24 may be aided by a grip 15 provided on the sides of anvil 22. A resting flange 21 in housing 24 limits the downward movement of spring 26.

In some instances, substrate 14 may comprise a sticky or slightly adhesive material. In such instances it is preferred that ram 18 have a non-stick end 17 comprising a non-stick material. Such a non-stick material may comprise polished steel or chrome, or a coating of a polymerized substituted hydrocarbon, such as Teflon® polymer.

Those skilled in the art will recognize that ram 18, in its entirety, may comprise such a non-stick material.

A non-stick ram 18, or a ram 18 with a non-stick end 17 may be particularly useful in an automated system where sample plugs are cut automatically. In an automated system the non-stick properties of ram 18 makes easier the automatic placement of plug samples in automated testing equipment since, if properly calibrated and adjusted, the plug 16 of material will drop off the end of ram 18 without manual intervention, and the plug 16 can be dropped into selected sample holders in the automatic equipment.

Figure 5:
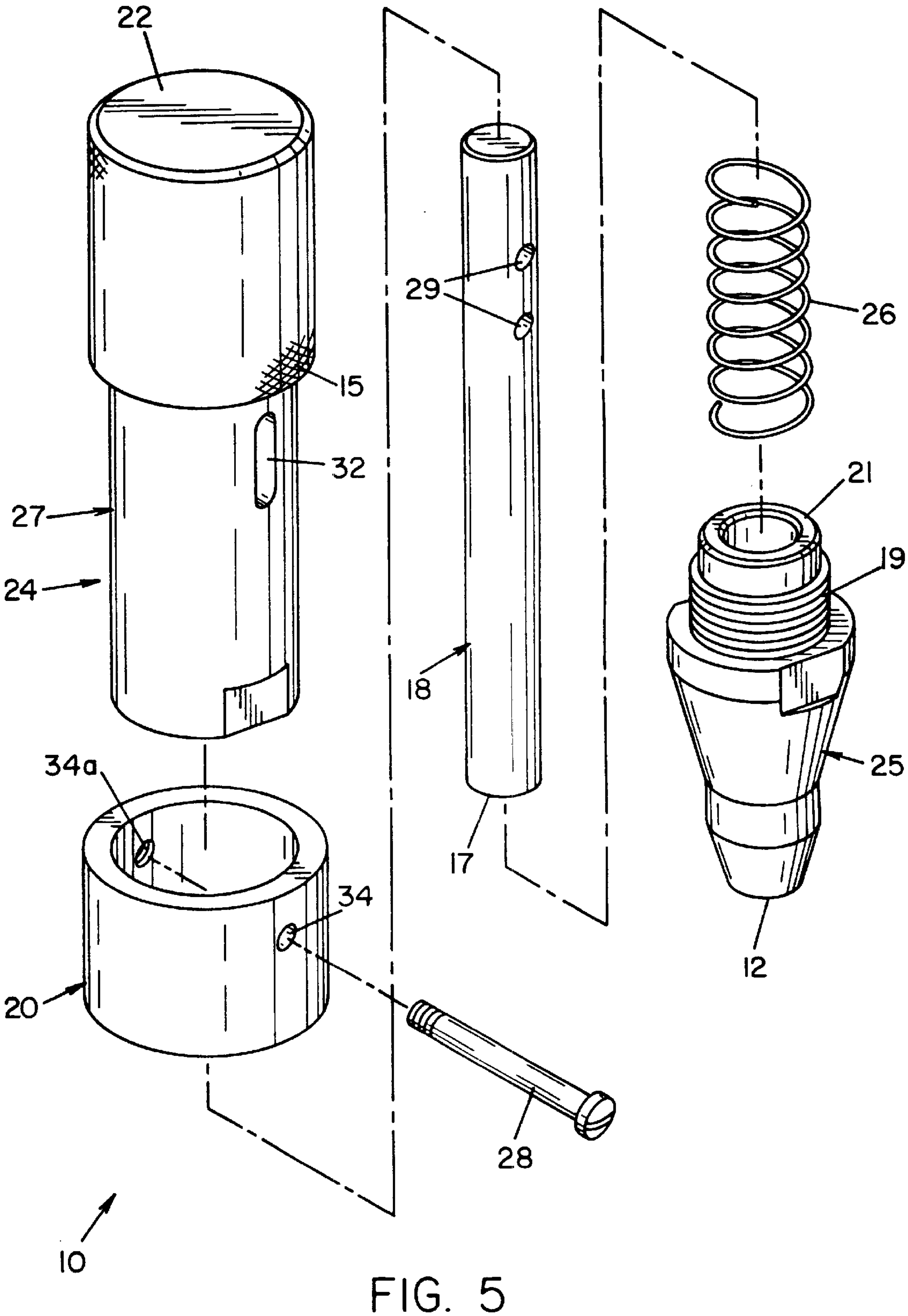
FIG. 5 illustrates an exploded view of the component parts of the apparatus.

With reference now to FIG. 5, component parts of the illustrated apparatus of the invention are shown in an exploded view wherein it can be seen that housing 24 comprises an upper portion 27 and a lower portion 25 which may be connected together by a mechanical means 19. Mechanical means 19 comprises threads in the illustrated embodiment. Mechanical means 19 makes possible a change in the length of apparatus 10, in that longer or shorter versions of upper portion 27 may be combined with lower portion 25, or longer or shorter versions of lower portion 25 may be combined with upper portion 27. Also, although the endless cutting edge of cutting end 12 is illustrated in the figures as resenting a circle, other sample shapes may be obtained by replacing lower portion 25 with a similar component having a differently shaped endless cutting edge.

If different lengthened housings 24 are used, the position of mm 18 within housing 24 can be adjusted by changing the position of hole 29 which is used to receive pin 28. Pin 28 passes through hole 34 in collar 20 into hole 29 in ram 18, and is threaded into hole 34*a* of collar 20. As described above, pin 28 moves in slot 32 which allows movement of collar 20 relative to housing 24.

Figure 6A:
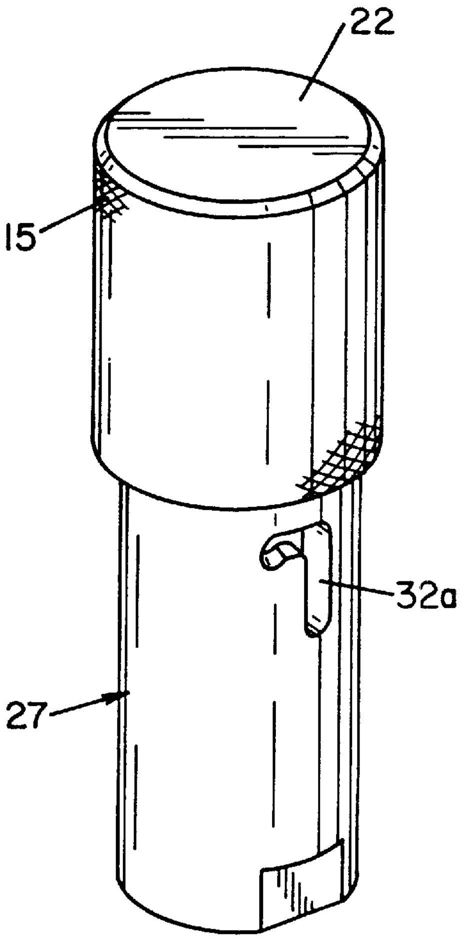

With reference now to FIG. 6*a*, a locking mechanism 32*a* may be used to lock the position of ram 18 relative to housing 24 while a sample is being obtained. In such an embodiment, when removal of the sample 16 from cutting end 12 of housing 24 is desired, the locking mechanism 32*a* is activated so that the ram can move within housing 24.

Those skilled in the art will recognize that other similar locking mechanisms, and other types of locking mechanisms, such as ratchets, can also be used in the apparatus of the invention.

Figure 6B:
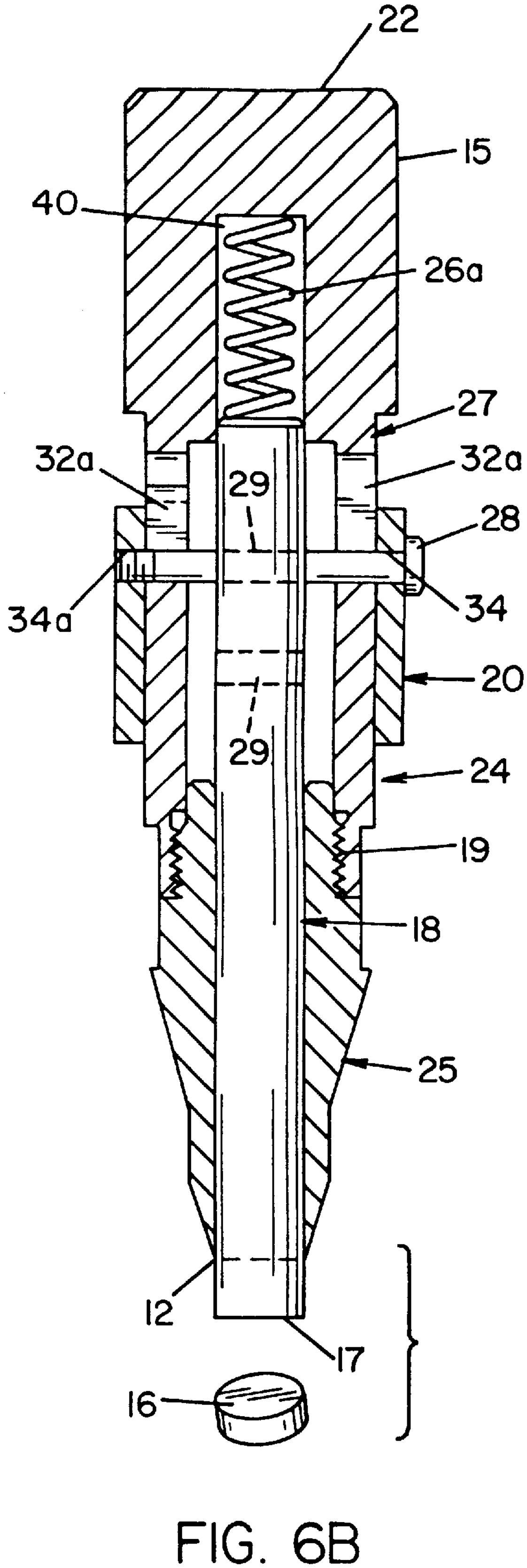

With reference now to FIG. 6*b*, in an embodiment where a locking mechanism is used to lock the position of the ram 28 relative to housing 24, different types of spring loading may be used relative to and 18. For example, spring 26*a* may be between ram 18 and opening 40 in anvil 22, to provide constant pressure against mm 18, so that when a locking mechanism, such as locking mechanism 32*a* is activated, ram 18 automatically is forced in the direction of cutting end 12.

In an alternative embodiment, a slings serving the same function as 26*a* may encompass the ram 18 in the same manner shown for spring 26, but extend beyond the end of ram 18 into opening 40 of anvil 22.

In the use of apparatus 10, the lab technician, dependent on the type of material being tested, may grab housing 24 by grip 15, and jab cutting end 12 into a substrate 14, or may place cutting end 12 against substrate 14 and strike anvil 22 with a hammer or other object in the direction of arrow 36.

Depending on the thickness of substrate 14, cutting end 12 may cut through substrate 14 to form plug 16, or plug 16 may be broken off the main body of material by twisting or rocking housing 24.

To remove plug 16 from housing 24, in the case where the embodiment of apparatus 10 which is illustrated in FIGS. 1-5 is used, the technician may grab grip 15 with one hand, and move collar 20 in the direction of arrow 38 with the other hand, whereby pin 28 will move in the direction of arrow 38, forcing ram 18 in the same direction, which will force plug 16 out of housing 24. Plug 16 can then be further processed for chemical or physical testing as needed.

What is claimed is:

1. An apparatus for obtaining a plug of material for testing comprising (a) a housing having a cutting end and an anvil end (b) a ram contained within said housing (c) a spring loading means associated with said ram, the spring being in a surrounding relationship with said ram, and (d) a collar disposed over an outside surface of said housing and having a non-fixed relationship with said housing and a having a fixed relationship with said ram, and wherein said housing has an upper portion and a lower portion which are connected to each other by mechanical means, and said lower portion has a resting flange which provides a compression point for the spring.

2. The apparatus of claim 1 wherein said spring is loaded within said housing in a cavity of the anvil.

3. The apparatus of claim 1 wherein said collar is associated with said housing though a pin which passes though holes in said collar and a slot in said housing.

4. The apparatus of claim 1 wherein said housing has an endless cutting end and an anvil end.

5. The apparatus of claim 4 wherein said housing has a grip in proximal relation to said anvil end.

* * * * *